June 10, 1947. G. N. PROCTOR 2,422,130
STORAGE BATTERY PLATE AND SEPARATOR ASSEMBLY
Filed Jan. 14, 1944
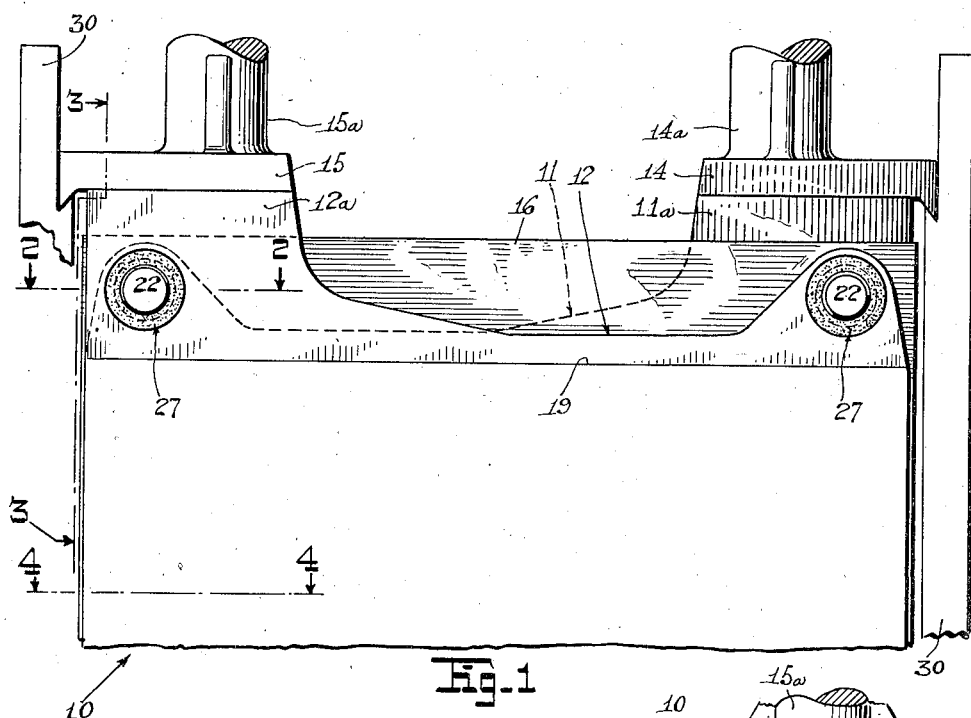
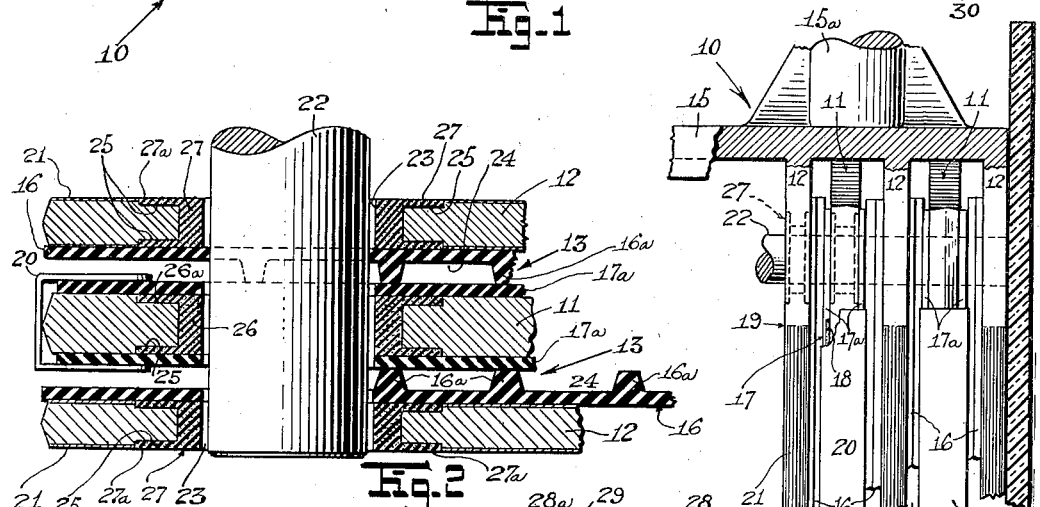
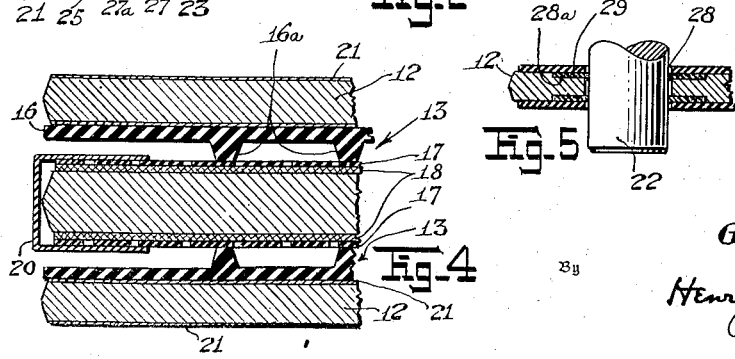
Inventor
George N. Proctor
By Henry Lanahan
Attorney Patented June 10, 1947

2,422,130

UNITED STATES PATENT OFFICE 2,422,130

STORAGE BATTERY PLATE AND SEPARATOR ASSEMBLY

George N. Proctor, Verona, N. J., assignor to Thomas A. Edison, Incorporated, West Orange, N. J., a corporation of New Jersey Application January 14, 1944, Serial No. 518,483

3 Claims. (Cl. 136—81)

This application is a continuation-in-part of my pending application Serial No. 424,632, filed December 27, 1941, now Patent No. 2,381,140, dated Aug. 7, 1945.

This invention relates particularly to an improved battery plate and separator assembly—hereinafter termed the battery plate assembly—for storage batteries, especially storage batteries of the heavy-duty type, and it is a general object to provide a highly efficient and durable battery plate assembly for such batteries.

A particular primary object of my invention is to interconnect mechanically a set of battery plates and intervening separators into a compact unitary structure wherein the battery plates are sufficiently insulated from each other to withstand heavy vibration over long periods of service without development of "shorts" between adjacent battery plates.

It is another object to provide an improved battery plate assembly which has a high capacity per unit of volume.

It is another object to provide a tight compact battery plate assembly which has a long life of service.

It is another object to provide a unitary battery plate assembly wherein the battery plates are effectively insulated from being short circuited by deposits of the highly conductive material typically present in the electrolyte of storage batteries.

A further object is to provide improved means and structure for fulfilling the functions above stated.

Other objects and features of my invention will be apparent from the following description and the appended claims.

In the description of my invention reference is had to the accompanying drawings, of which:

Figure 1 is a fractional elevational view of a battery plate and separator assembly embodying my invention.

Figure 2 is a fractional sectional view of the battery plate assembly of Figure 1 taken on the line 2—2 of that figure;

Figure 3 is a fractional sectional view taken substantially on the line 3—3 of Figure 1;

Figure 4 is another fractional sectional view taken on the line 4—4 of Figure 1; and Figure 5 is a fractional view, similar to Figure 2, illustrating a second embodiment of my invention.

In the drawings there appears a battery plate assembly 10 comprising a stack of alternately positive and negative battery plates 11 and 12 and of separator groups 13 interposed between adjacent battery plates. The battery plates 11 and 12 have upstanding lugs 11a and 12a of which those of one polarity are at one side of the assembly and those of the opposite polarity are at the other side. The lugs are suitably secured to conducting straps 14 and 15 preferably in the manner described in my patent abovementioned. These straps have respective posts 14a and 15a forming the terminals of the battery cell. This battery plate assembly is fitted into a battery case fractionally shown as 30.

Each separator group 13 suitably comprises three separator sheets which in going from negative to positive battery plates appear as follows: the microporous rubber sheet 16 having a flat side facing the adjacent negative battery plate and provided with spaced vertical ribs 16a on its other side, a flat perforated rubber sheet 17 lying against the ribbed side of the microporous sheet, and a flat glass wool sheet 18 lying against the perforated sheet as shown in Figure 4. In the battery plate assembly, the glass wool sheets are preferably terminated on a line 19 somewhat below the top edges of the battery plates, and the rubber sheets 16 and 17 are extended above the battery plates as shown in Figure 1. The perforating of the rubber sheet 17 is however confined to the lower portion of the sheet below line 19, while the upper portion 17a above the line 19 is made solid and thicker than the lower portion, the increase in thickness of the upper portion 17a being just slightly less than the thickness of the glass wool sheet 18 so that when the stack of battery plates and separator sheets are clamped together pressure will be applied to the glass wool sheet to hold it in place. The perforated rubber sheet 17 and glass wool sheet 18 are securely held along their vertical borders to the interposed positive battery plates 11 by a clamp 20, made of a suitable insulating material, the legs of which lie within the spaces between the rubber microporous sheets 16 and adjacent perforated sheets 17 as shown in Figures 2 and 4.

The portion of the negative battery plates above the line 19 is reduced in thickness by receding the side walls at each side. In these side recesses of each plate and over the top and end edges there is provided a thin coating 21 of a suitable rubber compound, this coating being applied by spraying or dipping. The function of this coating is to prevent short circuiting of adjacent battery plates by settling of the diffused conducting material, which is typically present in the electrolyte of storage batteries, onto and across the top portions of the battery plates and intervening separator sheets, this settling or depositing of the conductive material having become known in the art as "mossing" or "treeing" in view of the sediment acquiring a mossy appearance and having a tendency to branch out as it grows.

In large-sized batteries the battery plate assemblies are very expensive and it is very important that every precaution be taken to realize the maximum possible life from the battery plates. To attain maximum life of the plates it is important, among other things, that the plates be held together as a fixed unitary structure so that they will not sag or buckle, or be displaced relative to each other during long periods of use of the cell under conditions of heavy vibration, tilting, and repeated cycling—that is, charging and discharging. When the plates are large and heavy, the battery plate assemblies have been rigidified by rods extending transversely through the whole assembly. In the present instance, there are two such rods 22 made of an insulating material such as hard rubber, which extend through apertures 23 provided in the upper portions of the battery plates and intervening separator groups.

A further important condition to be fulfilled for realizing the maximum life of the battery plates is that the active material in the plates, especially the negative plates, shall be prevented from undergoing any substantial expansion with cycling, for otherwise it is found that impurities will escape from the active material into the electrolyte and there produce harmful results affecting the life and operation of the cell. To prevent the expansion of the active material with cycling, it is important that the battery plates be under compression during service, and that this compression be distributed over the whole side area of each plate. Preferably, pressure is brought to bear on the whole battery plate assembly by tightly fitting the assembly into the battery case, and the compressive force on the individual battery plates is caused to be distributed over the whole area of the plates by making the separator groups of uniform thickness and with flat outer sides, and of a hollow construction so adapted that the internal stress of each separator group when subjected to a given compression will be distributed substantially evenly over the surface area of the group. Such hollow construction is attained by providing the microporous sheet 16 with the multitudinous ribs 16a, spaced typically at intervals of about ½", which contact and bear against the adjacent perforated rubber sheet 17. These ribs transmit the pressure through the separator groups substantially evenly and yet permit ready flow of the electrolyte to all surface areas of the battery plates by way of the channels 24 between the ribs.

Although the cross rods 22 are highly essential to the needed rigidification of the battery plate assembly, they have been a source of trouble in that they have weakened the insulation between adjacent battery plates. This weakening in insulation results from the fact that the rods provide horizontal surfaces bridging the spaces between adjacent battery plates onto which the conductive material of the electrolyte may settle and ultimately produce local shorts between the plates. Typically, in the battery plate assembly above described, this conductive material will settle onto the rods 22 in the channels 24 between the microporous and perforated rubber sheets 16 and 17, and grow out through the apertures in the separators and come into contact with the plates to produce local short circuits. I have found however that such short circuits may be prevented effectively and positively while maintaining a tight and compact assembly of the battery plates and separators as above described. This is accomplished by providing recesses 25 in the battery plates around the apertures 23 through which the rods 22 pass, and lining the apertures of the negative and positive plates with insulating grommets 26 and 27 respectively. These grommets have flanged ends 26a and 27a that fit the recesses 25 of the plates. The axial length of each grommet along the rods 22 is made substantially equal to the thickness of the respective battery plates so that the ends of the grommet, when in assembled position, will lie flush with the side surfaces of the plate. Thus, the grommet does not require any air space between the battery plate and adjacent separator group with the result that the compactness of the battery plate assembly and the equalized pressure distribution onto the battery plates is maintained as above explained. Yet, by having contact of each separator group with the flanges of the grommets, and by having these flanges extend radially outwardly to overlap a substantial portion of the battery plate adjacent each rod, the conductive sediment of the electrolyte is prevented from growing out from the rods between the grommets and adjacent separator groups into contact with the battery plates.

The grommets are preferably made in one piece but of a soft rubber so that they may be easily inserted into the apertures of the battery plates. It will however be understood that alternatively each grommet may comprise two or more pieces and be then made of a relatively hard insulating material such as of rubber, plastic, etc.

In the preferred form of my invention, I insert an insulating grommet in each positive and negative battery plate; but effective insulation of the battery plates may yet be obtained at the cross rods by putting grommets in the battery plates of only one polarity.

The following typical dimensions have been found to give satisfactory results: The cross rods 22 may have a diameter of ⅝", the thickness of the positive battery plates may be ¼" and of the negative plates $\tfrac{3}{16}$", the thickness of the microporous sheets 16 (with ribs) .12" and of the separator sheets 17 and 18 $\tfrac{3}{64}$", the inside diameter of the grommets may be $\tfrac{23}{32}$", the diameter of the flanges of the grommets may be $1\tfrac{13}{32}$", the wall thickness of the flanges $\tfrac{3}{32}$" and of the annular portion of the grommets between flanges $\tfrac{1}{16}$".

A second form of insulating means for preventing short circuiting of adjacent battery plates at the rods 22 is shown in Figure 5. In this embodiment of my invention, the battery plates have apertures 28 for receiving the rods 22, which apertures are made just slightly larger than the diameter of the rods, and surrounding these apertures are annular recesses 28a in the side walls of the battery plates. In these recesses 28a there are inserted insulating washers 29 which are press fitted onto the rods 22. The thickness of these washers is approximately equal to the depth of the recesses so that the outer sides of the washers will be just flush with the sides of the plates. These washers are preferably made of a fairly hard material such as of hard rubber. In this embodiment, reliance is had on the tight fit of the washers with the rods 22 to prevent the conductive sediment that settles on the rods 22 from growing into contact with the battery plates.

While I have herein shown and described certain preferred embodiments of my invention, it will be understood that these embodiments are illustrative and not necessarily limitative of my invention as the same are subject to changes and modifications without departure from the scope of my invention, which I endeavor to express according to the following claims.

I claim:

1. A battery plate assembly comprising a stack of spaced battery plates, a rigidifying rod extending through said plates, said plates having recesses in the side walls thereof around said rod, and insulating members embracing said rod and disposed within said recesses, said insulating members having the exterior side surfaces thereof substantially flush with the side surfaces of the respective battery plates.

2. In a storage battery: an assembly of alternately positive and negative battery plates and of intervening separators, a rigidifying rod passing through said assembly of battery plates and separators, and insulating members embracing said rod and embedded in the side walls of the battery plates of at least one polarity, the exterior side surfaces of said insulating members being substantially flush with the respective side surfaces of the respective battery plates so as to permit said battery plates and separators to be assembled in compact relationship.

3. In a storage battery: an assembly of alternately positive and negative battery plates and of intervening separators, the adjacent surfaces of said plates and separators being substantially flat for assembly in compact stacked relationship, a rigidifying rod passing through said assembly, and insulating means lining the hole in each of said battery plates through which said rod passes, said battery plates having annular recesses in the side wall portions thereof surrounding said rod, and said insulating means having end flanges engaging said recesses, said end flanges being substantially flush with the side wall surfaces of said battery plates.

GEORGE N. PROCTOR.

REFERENCES CITED

The following references are of record in the file of this patent:

UNITED STATES PATENTS

| Number | Name | Date |
| --- | --- | --- |
| 478,485 | Waldron | July 5, 1892 |
| 1,165,101 | Hutchison et al. | Dec. 21, 1915 |
| 1,641,842 | Fletcher | Sept. 6, 1927 |
| 2,175,885 | Eddy | Oct. 10, 1939 |
| 1,204,481 | Norton | Nov. 14, 1916 |
| 1,364,469 | Woodbridge | Jan. 4, 1921 |